US005755866A

United States Patent [19]
Bayly et al.

[11] Patent Number: 5,755,866
[45] Date of Patent: May 26, 1998

[54] PRIMER COMPOSITION FOR 1-PART ROOM TEMPERATURE VULCANIZABLE SILICONE COMPOSITIONS

[75] Inventors: Brian P. Bayly, Middle Grove; Gary M. Lucas, Scotia; Van W. Stuart, Clifton Park, all of N.Y.

[73] Assignee: General Electric Company, Waterford, N.Y.

[21] Appl. No.: 698,009

[22] Filed: Aug. 13, 1996

[51] Int. Cl.⁶ ............................................. B05D 5/10
[52] U.S. Cl. .......................... 106/287.13; 106/287.16
[58] Field of Search ........................ 106/287.13, 287.16

[56] References Cited

U.S. PATENT DOCUMENTS

| | | | |
|---|---|---|---|
| 3,671,483 | 6/1972 | Young . | |
| 4,332,844 | 6/1982 | Hamada et al. | 427/387 |
| 4,525,400 | 6/1985 | Surprenant | 428/54 |
| 4,681,636 | 7/1987 | Saito et al. | 106/287.15 |
| 4,749,741 | 6/1988 | Saito et al. | 524/859 |
| 5,238,708 | 8/1993 | Blizzard | 427/387 |
| 5,292,799 | 3/1994 | Naito et al. | 524/783 |
| 5,534,610 | 7/1996 | Bayly et al. | 528/38 |

*Primary Examiner*—Erma Cameron
*Attorney, Agent, or Firm*—Kenneth S. Wheelock

[57] ABSTRACT

A primer comprising an organotitanate and an epoxysilane, when applied to a substrate, renders curable silicone compositions more adherent to a substrate after the silicone compositions have cured by increasing cohesive failure.

8 Claims, No Drawings

PRIMER COMPOSITION FOR 1-PART ROOM TEMPERATURE VULCANIZABLE SILICONE COMPOSITIONS

FIELD OF THE INVENTION

The present invention relates to a primer composition for 1-part room temperature vulcanizable silicone compositions wherein the primer comprises a cyclicsiloxane, an epoxy functionalized silane and an alkyl titanate.

BACKGROUND OF THE INVENTION

In order to adhere room temperature vulcanizable silicone elastomers to various substrate it has usually been necessary to first coat or treat the substrate with a primer. The typical primers employed for this purpose have heretofore contained an organic solvent and a coupling agent. U.S. Pat. Nos. 4,749,741; 4,681,636, and 3,671,483 disclose such primer compositions. Thus it has frequently been necessary to employ primers when using 1-part room temperature vulcanizable silicone compositions to adhere such compositions to certain substrates.

Because of in creasing concerns about the release of volatile organic solvents to the atmosphere in various organic products such as paints, sealants, aerosols, and the like and the deleterious effects on the environment of the release of volatile organic compounds into the environment or atmosphere, it has become desirable to minimize the volatile organic content of many commercially useful products. The absence of solvents, which dilute the effective concentration of high molecular weight materials that are also usually viscous renders the simple removal of solvent from formulations a challenging task. This is because the compositions themselves must be reformulated and frequently there must be a change in the molecular architecture of the compounds employed in order to secure the same benefits of a given intended product while reducing the amount of volatile organic matter present in the formulation.

While the elimination of volatile organic compounds is desirable, the silicone primer compositions that increase adherence to the substrate layer typically employ a linear polymeric silicone that contains reactive groups which cure upon application. Thus various functionalized forms of polydiorganosiloxanes are present in almost all priming compositions suitable for use with silicone sealants. For example, U.S. Pat. No. 5,238,708 dispenses with organic solvents but the priming composition contains an alkoxysilane. The use of alkoxy silicone materials to improve adhesion between silicone rubbers and substrates appears to be a fairly standard technique, e.g. U.S. Pat. No. 4,332,844. While it is necessary that the silicone polymer in a given primer composition contain some alkoxy endstopping groups it is not necessary that all of the substituents on the terminal M groups of the silicone be alkoxy groups. Thus for example, mixed functionalities will provide the necessary improvement in properties, e.g. methyldimethoxysiloxyl, so long as some of the substituents are alkoxy (methoxy).

The apparent requirement that priming compositions contain some of the polymerizable species common to the sealant that will applied to the primed surface increases difficulties in compounding sealants and primers that are compatible with one another. Incompatibility of the primer with the subsequently applied sealant leads to adhesive failure. Thus there exists a need for a priming composition that reduces adhesive failure while increasing cohesive failure and simultaneously eliminates the need for the presence of a linear olymeric silicone present in the priming composition.

SUMMARY OF THE INVENTION

We now disclose a priming composition suitable for use with room temperature vulcanizable silicone compositions that improves cohesion and adhesion of subsequently applied silicone sealant compositions but that does not require the presence of a linear polymeric silicone.

Thus the present invention provides for a primer for a substrate comprising:

(a) an organotitanate having the formula:

where $R^1$ is a monovalent hydrocarbon radical having from one to ten carbon atoms; and (b) an epoxysilane having the formula:

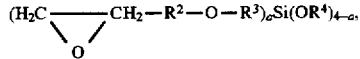

where $R^2$ is a divalent hydrocarbon radical having from one to ten carbon atoms; $R^3$ is a divalent hydrocarbon radical having from one to ten carbon atoms; $R^4$ is a monovalent hydrocarbon radical having from one to ten carbon atoms; and a is an integer having values ranging from one to three.

Because the primer composition of the present invention improves adhesion there is further provided a method for improving the adhesion of a room temperature vulcanizable silicone composition to a substrate comprising:

(a) coating a substrate with a primer comprising:

(1) an organotitanate having the formula:

$Ti(OR^1)_4$, where $R^1$ is a monovalent hydrocarbon radical having from one to ten carbon atoms; and (2) an epoxysilane having the formula:

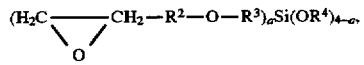

where $R^2$ is a divalent hydrocarbon radical having from one to ten carbon atoms; $R^3$ is a divalent hydrocarbon radical having from one to ten carbon atoms; $R^4$ is a monovalent hydrocarbon radical having from one to ten carbon atoms; and a is an integer having values ranging from one to three producing thereby a primed substrate; and (b) applying to said primed substrate a room temperature vulcanizable silicone composition.

DETAILED DESCRIPTION OF THE INVENTION

The priming compositions of the present invention comprise an organotitanate and an epoxy functional silane. Because it is not necessary to use both of these materials together in the high concentrations that would be represented by their undiluted state, it is frequently much more practical to utilize the combined properties of these two materials when they are diluted in a non-reactive solvent or carrier. The inert solvent or carrier thus becomes the major component in terms of weight percent composition.

The priming compositions of the present invention thus comprise:

(a) an inert, volatile solvent;

(b) an organotitanate having the formula:

$Ti(OR^1)_4$.

where $R^1$ is a monovalent hydrocarbon radical having from one to ten carbon atoms, preferably one to eight, more preferably one to six, and most preferably one to four carbon atoms; and (c) an epoxysilane having the formula:

$$(H_2C\underset{O}{\underbrace{\phantom{xxx}}}CH_2-R^2-O-R^3)_aSi(OR^4)_{4-a},$$

where $R^2$ is a divalent hydrocarbon radical having from one to ten carbon atoms, preferably one to eight, more preferably one to six, and most preferably one to four carbon atoms; $R^3$ is a divalent hydrocarbon radical having from one to ten carbon atoms, preferably one to eight, more preferably one to six, and most preferably one to four carbon atoms; and $R^4$ is a monovalent hydrocarbon radical having from one to ten carbon atoms, preferably one to eight, more preferably one to six, and most preferably one to four carbon atoms; and a is an integer having values ranging from one to three.

The inert volatile solvent or carrier may be any suitable solvent or carrier or mixture of solvents or carriers for the two components satisfying the criteria that the solvent or carrier is:

1) non-reactive with either the titanate ester or the epoxysilane and 2) volatile.

Applicants define the term volatile solvent or carrier to be any non-aqueous solvent or carrier having a boiling point below 100° C. Thus volatile liquid hydrocarbon solvents such as volatile paraffinic hydrocarbons, e.g. pentane, the iso-pentanes, cyclopentane, hexane, the iso-hexanes, cyclohexane, heptane, the iso-heptanes, cycloheptane, octane, the iso-octanes, cyclo-octane and the like; volatile aromatic solvents such as benzene, toluene, the various xylenes, mesitylene and the like are examples of suitable hydrocarbon solvents that may be used. It is also possible to utilize low molecular weight oxygen containing solvents such as alcohols, ketones, aldehydes and the like. However, because the organotitanate is susceptible to hydrolysis, solvents that are miscible with water or easily contaminated by water should be anhydrous. Additional non-reactive volatile solvents that may be employed may be selected from the group consisting of:

(1) cyclic diorganosiloxanes having the formula:

$(R^5_2SiO)_x$, where $R^5$ is a monovalent hydrocarbon radical having from one to ten carbon atoms, preferably one to eight, more preferably one to six, and most preferably one to four carbon atoms; and x is an integer having values ranging from three to eight and (2) linear volatile silicones having the formula:

$(R^6_3SiO_{1/2})(R^7_2SiO_{2/2})_y(R^6_3SiO_{1/2})$, where each $R^6$ is independently a monovalent hydrocarbon radical having from one to ten carbon atoms, preferably one to eight, more preferably one to six, and most preferably one to four carbon atoms; each $R^7$ is independently a monovalent hydrocarbon radical having from one to ten carbon atoms, preferably one to eight, more preferably one to six, and most preferably one to four carbon atoms; and y is an integer having values ranging from 0 to 8.

The organotitanate esters defined by the formula:

$Ti(OR^1)_4$, are preferably selected from the group consisting of tetrabutyl titanate, tetramethyl titanate, tetra-isopropyl titanate, ethylmethyldibutyl titanate, and tetra-ethylhexyl titanate. Most preferably the titanate ester is tetrabutyl titanate. The preferred epoxy silane is gycidoxypropyltrimethoxysilane.

The compositions of the present invention are proportioned on the basis of weight as follows:

(a) 100 parts by weight of an inert, volatile solvent;

(b) from 0.1 to about 20.0 parts by weight, preferably from about 1.0 to about 17.0 parts by weight, more preferably from about 5.0 to about 15.0 parts by weight and most preferably from about 8.0 to about 12.0 parts by weight of a titanate ester having the formula $Ti(OR^1)_4$; and (c) from 0.1 to about 20.0 parts by weight, preferably from about 1.0 to about 17.0 parts by weight, more preferably from about 5.0 to about 15.0 parts by weight and most preferably from about 8.0 to about 12.0 parts by weight of an epoxysilane having the formula:

$$(H_2C\underset{O}{\underbrace{\phantom{xxx}}}CH_2-R^2-O-R^3)_aSi(OR^4)_{4-a}.$$

The compositions of the present invention thus range from a total composition of 100.2 parts by weight to a total composition of 140 parts by weight.

The priming compositions of the present invention improve adhesion of subsequently applied curable silicone compositions to the primer. The primer adheres to the substrate. Thus there is provided a means of preparing an adherent laminate comprising in order a substrate, the priming composition of the present invention, and a silicone sealant consisting of applying the primer to the substrate and then applying the silicone to the primed substrate. When first applied the silicone sealant is a curable composition, preferably a room temperature vulcanizable composition, which then cures resulting in a cured silicone composition.

When a substrate is coated with a primer and subsequently coated with a sealant composition there are two different types of failure that are of primary concern. The first is adhesive failure. The second is cohesive failure. Both modes of failure occur when a substrate coated with the sealant or a primed substrate coated with the sealant is pulled to destruction. Adhesive failure is a failure of the sealant to adhere to the substrate or primed substrate. Cohesive failure is a failure of the sealant layer to self-adhere. Thus cohesive failure leaves part of the sealant adhering to the primer or substrate rather than to itself while adhesive failure is a failure of the bond between the laminate layers of the sealant and the primer or the sealant and the substrate. Consequently as a primer improves adhesion between the sealant and the substrate, adhesive failure decreases and the predominate failure mode becomes cohesive. Increasing cohesive failure therefore indicates increasing adhesion and decreasing adhesive failure.

All United States patents referenced herein are herewith and hereby specifically incorporated by reference.

Experimental

Procedure

1"×4" panels of mill finished aluminum and polyvinylchloride were cleaned with isopropanol. A thin film of the candidate primer was then applied to the surface of the aluminum or polyvinyl chloride panel with a clean dry cloth. Immediately following application of the primer, peel adhesion specimens, conforming to ASTM-C-794, were prepared using a silicone room temperature vulcanizable composition curing by means of a tin catalyzed alkoxy cure. After 10 days of curing on the primed substrates, the specimens were tested for cohesive failure. Additional, identical samples were prepared and cured for 10 days, followed by a 7 day exposure to water at 25° C. These samples were also tested for cohesive failure.

EXAMPLE 1

Primer: octamethylcyclotetrasiloxane

TABLE 1

Cohesive Failure using Octamethylcyclotetrasiloxane Primer

| Substrate | 10 Day Cure % Cohesive failure | 10 Day Cure plus 7 Day $H_2O$ % Cohesive Failure |
|---|---|---|
| aluminum | 20 | 20 |
| polyvinyl chloride | 80 | 0 |

EXAMPLE 2

Primer: 90 parts by weight octamethylcyclotetrasiloxane and 10 parts by weight gycidoxypropyltrimethoxysilane

TABLE 2

Cohesive Failure using Octamethylcyclotetrasiloxane/ Gycidoxypropyltrimethoxysilane Primer

| Substrate | 10 Day Cure % Cohesive failure | 10 Day Cure plus 7 Day $H_2O$ % Cohesive Failure |
|---|---|---|
| aluminum | 20 | 100 |
| polyvinyl chloride | 100 | 10 |

EXAMPLE 3

Primer: 90 parts by weight octamethylcyclotetrasiloxane and 10 parts by weight tetrabutyl titanate

TABLE 3

Cohesive Failure using Octamethylcyclotetrasiloxane/Tetrabutyl titanate Primer

| Substrate | 10 Day Cure % Cohesive failure | 10 Day Cure plus 7 Day $H_2O$ % Cohesive Failure |
|---|---|---|
| aluminum | 20 | 20 |
| polyvinyl chloride | 100 | 90 |

EXAMPLE 4

Primer: 80 parts by weight octamethylcyclotetrasiloxane, 10 parts by weight gycidoxypropyltrimethoxysilane, and 10 parts by weight tetrabutyl titanate

TABLE 4

Cohesive Failure using Octamethylcyclotetrasiloxane/Tetrabutyl titanate/Gycidoxypropyltrimethoxysilane Primer

| Substrate | 10 Day Cure % Cohesive failure | 10 Day Cure plus 7 Day $H_2O$ % Cohesive Failure |
|---|---|---|
| aluminum | 90 | 100 |
| polyvinyl chloride | 100 | 100 |

EXAMPLE 5

Primer: None. i.e. unprimed substrates

TABLE 5

Cohesive Failure using No Primer

| Substrate | 10 Day Cure % Cohesive failure | 10 Day Cure plus 7 Day $H_2O$ % Cohesive Failure |
|---|---|---|
| aluminum | 20 | 10 |
| polyvinyl chloride | 100 | 10 |

The priming compositions of the present invention thus render curable silicone compositions more adherent to aluminum and polyvinyl chloride substrates, increasing the cohesive failure to 90% or greater.

That which is claimed is:

1. A primer for a substrate selected from the group consisting of aluminum and polyvinylchloride wherein said primer is a primer for a silicone elastomer comprising:

(a) an organotitanate having the formula:

$$Ti(OR^1)_4,$$

where $R^1$ is a monovalent hydrocarbon radical having from one to ten carbon atoms;

(b) an epoxysilane having the formula:

$$(H_2C\underset{O}{\overset{}{\diagdown\diagup}}CH_2-R^2-O-R^3)_a Si(OR^4)_{4-a},$$

where $R^2$ is a divalent hydrocarbon radical having from one to ten carbon atoms; $R^3$ is a divalent hydrocarbon radical having from one to ten carbon atoms; $R^4$ is a monovalent hydrocarbon radical having from one to ten carbon atoms; and a is an integer having values ranging from one to three; and (c) an inert volatile solvent selected from the group consisting of (1) cyclic diorganosiloxanes having the formula:

$$(R^5{}_2SiO)_x.$$

where $R^5$ is a monovalent hydrocarbon radical having from one to ten carbon atoms and x is an integer having values ranging from three to eight; and (2) linear volatile silicones having the formula:

$$(R^6{}_3SiO_{1/2})(R^7{}_2SiO_{2/2})_y(R^6{}_3SiO_{1/2}),$$

where each $R^6$ is independently a monovalent hydrocarbon radical having from one to ten carbon atoms; each $R^7$ is independently a monovalent hydrocarbon radical having from one to ten carbon atoms; and y is an integer having values ranging from 0 to 8.

2. The composition of claim 1 wherein the organotitanate is selected from the group consisting of tetrabutyl titanate, tetramethyl titanate, tetraisopropyl titanate, ethylmethyldibutyl titanate, and tetraethylhexyl titanate.

3. The composition of claim 2 where $R^2$ is —$CH_2$— and $R^3$ is —$CH_2CH_2CH_2$—.

4. The composition of claim 3 wherein a is one.

5. The composition of claim 4 wherein $R^4$ is methyl.

6. The composition of claim 5 wherein the organotitanate is tetrabutyl titanate.

7. The composition of claim 6 wherein the solvent is a cyclic diorganosiloxane.

8. The composition of claim 7 wherein x is four.

* * * * *